United States Patent Office 2,875,209
Patented Feb. 24, 1959

2,875,209
PROCESS FOR THE PRODUCTION OF 3-(OR 5)-AMINO-1,2,4-TRIAZOLE

Manfred Niese and Detlef Delfs, Opladen, Germany, assignors to Farbenfabriken Bayer Aktiengesellschaft, Leverkusen, Germany, a corporation of Germany No Drawing. Application December 18, 1956
Serial No. 628,987

Claims priority, application Germany December 23, 1955

8 Claims. (Cl. 260—308)

This invention relates to a process for the production of 3-(or 5)-amino-1,2,4-triazole. The application is a continuation-in-part of copending application Serial Number 496,604, filed March 24, 1955, now abandoned.

It is an object of the present invention to provide a new economical method for the production of 3-(or 5)-amino-1,2,4-triazole. Another object is to provide a process which yields directly a very pure 3-(or 5)-amino-1,2,4-triazole which can be used directly without further purification as defoliant. Other objects will appear hereinafter.

As we have found 3-(or 5)-aminotriazole can be obtained in a simple manner and with a practically quantitative yield if an aminoguanidine salt such as the bicarbonate, sulfate or nitrate is heated with formic acid in an inert solvent at temperatures below 120° C., preferably within the range of about 100–120°.

In a modification of this process a formyl-aminoguanidine salt is used as starting material in place of the aminoguanidine salt and formic acid.

If aminoguanidine bicarbonate is used as starting material in the process of the invention, the corresponding free aminotriazole is obtained directly, since in this case carbon dioxide is split off during the reaction. On the other hand, when a salt of aminoguanidine with a mineral acid is used as starting material, such as for example aminoguanidine sulfate or aminoguanidine hydrochloride, the corresponding aminotriazole salt is obtained as final product, and this salt can be converted in known manner into the corresponding free aminotriazole, for example by a treatment with calcium carbonate.

Inert solvents which may be used by the process of the invention are water or inert organic solvents which are preferably capable of serving as an entrainer, which form an azeotropic mixture with the water formed during the reaction such as the toluene, and aliphatic hydrocarbons, such as iso-octane, which do not form an azeotropic mixture with water. If the process of the invention is carried out in the presence of water, in general it is not necessary to add water since 3 mols of water are formed by the triazole formation as can be seen by the following reaction scheme (aminoguanidine bicarbonate is used as starting material).

(1) Salt formation:

$$NH_2-\overset{\underset{\parallel}{NH}}{C}-NH-NH_2.H_2CO_3 + H.COOH \longrightarrow$$
$$NH_2-\overset{\underset{\parallel}{NH}}{C}-NH-NH_2.H-COOH + H_2O + CO_2$$

(2) Acylation:

$$NH_2-\overset{\underset{\parallel}{NH}}{C}-NH-NH_2.H-COOH \longrightarrow$$

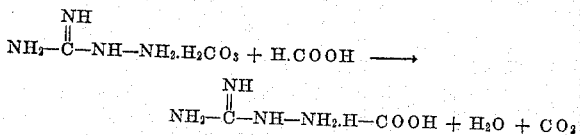

(3) Ring closure:

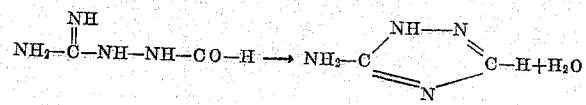

(4) Summary:

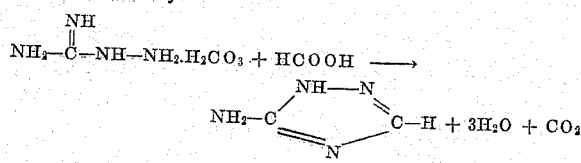

The process can be carried out by reacting the aminoguanidine salt, preferably aminoguanidine bicarbonate, with formic acid at first at normal or moderately elevated temperature, for example up to about 80° C., thus forming the formate of aminoguanidine and water with evolution of carbon dioxide. The aminotriazole can be obtained therefrom by heating at temperatures below 120° C., preferably within the range of about 100–120° C., water being split off. In one advantageous method of carrying out this reaction, initially such an amount of water is distilled off that the quantity of water remaining, taking into account the water of condensation formed in the reaction, yields an 80–85% solution with the aminotriazole formed on completion of the reaction. The reaction mixture is thereafter heated under reflux and while stirring until the conversion to aminotriazole is complete. The temperature of the reaction mixture rises at this point to about 110–115° C. At this temperature, the solution of aminotriazole in the concentration referred to is stable, so that no crystallization of aminotriazole takes place. It is of course also possible to use a more dilute solution, but this requires more time for the ring closure.

The triazole formation can be carried out as well by adding an inert organic diluent such as toluene which serves preferably as entrainer for removing the water formed during the reaction by an azeotropic distillation.

The reaction mixture can be worked up for example by allowing the mixture to cool and drying it in a drying chamber, roller drier or spray drier or by slightly diluting the reaction mixture with mother liquor from the preceding batch and allowing the resulting mixture to crystallize. In this way, a very pure product is obtained with a 98–100% content of 3- or 5-amino-1,2,4-triazole, and the yield is more than 95% of the theoretical, and thus is practically quantitative.

The following examples further illustrate the invention without, in any way, limiting it thereto.

Example 1

825 grams of aminoguanidine bicarbonate (82.6% = 5 mols) are mixed by stirring with 240 grams of formic acid (5.2 mols) in a flask provided with a stirrer device and a condenser having a separator for separating out water from any condensed liquid. 1500 milliliters of toluene are added and the mixture is gradually heated to 70° C. to 80° C., meanwhile being vigorously stirred until the evolution of carbon dioxide subsides and a second homogeneous layer (a solution of aminoguanidine formate in the water liberated during the formation of the salt) has formed beneath the toluene. The mixture is heated to boiling point and the water begins to separate out quickly, so that in about 2 hours more than two thirds of the water of reaction has separated out. The distillation thereof is continued with vigorous stirring. During the next one or two hours the layer becomes more and more viscous, and finally solidifies to form a solid product. Heating at temperatures up to about 111° C. is continued for another three to four hours while stirring well and until no more water passes over. The flask is then allowed to cool, and the product, which is practically insoluble in cold toluene, is filtered off with suction. 400 to 430 grams of an almost white product containing 95–99% of aminotriazole are obtained, this amount corresponding to a yield of 97–100% of the theoretical, calculated on aminoguanidine bicarbonate. The melting point of the crude product is 152 to 153° C. This product can readily be further purified by dissolving and crystallizing from water, alcohol or acetic ester. M. P. 156° C.

Instead of the aminoguanidine bicarbonate there can be used other salts such as the sulfate, nitrate or hydrochloride.

*Example II*

137 grams of aminoguanidine bicarbonate (=1 mol) are gradually mixed with 49.2 grams of formic acid (1.05 mols). After completion of the evolution of carbon dioxide, the mixture is boiled under reflux at 110–115° C. Thereby the aminotriazole is formed, whereby 3 mols of water are freed.

The amount of the aminotriazole formed is as follows:

After 4 hours, 74.6 mol-percent of aminotriazole, based on the aminoguanidine introduced
After 8 hours, 84.2 mol-percent of aminotriazole, based on the aminoguanidine introduced
After 14 hours, 89.6 mol-percent of aminotriazole, based on the aminoguanidine introduced
After 22 hours, 96.7 mol-percent of aminotriazole, based on the aminoguanidine introduced The aminotriazole can be obtained by cooling the reaction mixture and separating the precipitate.

*Example III*

137 grams of aminoguanidine bicarbonate (1 mol) are gradually mixed with 49.2 grams of formic acid (1.05 mols).

After the development of carbon dioxide is complete, the mixture is heated and 36 milliliters of water are distilled off. The mixture is then further heated under reflux at about 110–115° C. After 8 hours, the yield of aminotriazole is 99.2%.

The reaction mixture solidifies upon cooling and can be freed from the water in known manner, e. g. in vacuo. Melting point of the aminotriazole obtained: 152–153° C.

We claim:

1. A process for the production of a member selected from the group consisting of 3-(and 5)-amino-1,2,4-triazole, which comprises heating an aminoguanidine salt with formic acid at a temperature within the range of about 100–120° C. in an inert diluent and recovering said group member formed.

2. A process for the production of a member selected from the group consisting of 3-(and 5)-amino-1,2,4-triazole, which comprises heating an aminoguanidine salt with formic acid at temperatures below 120° C. distilling off such an amount of the water formed during the reaction that an 80–85% aqueous solution of said group member is obtained and recovering said group member formed.

3. A process for the production of a member selected from the group consisting of 3-(and 5)-amino-1,2,4-triazole, which comprises heating an aminoguanidine salt with formic acid at temperatures between about 100 and 120° C., and recovering said group member formed.

4. A process for the production of a member selected from the group consisting of 3-(and 5)-amino-1,2,4-triazole, which comprises heating an aminoguanidine salt with formic acid at temperatures below 120° C. in an inert organic solvent, capable of forming an azeotropic boiling mixture with water, continuously distilling off the water formed during the reaction as an azeotropic mixture with said solvent and recovering said group member formed.

5. Process in accordance with claim 1, in which said aminoguanidine salt is aminoguanidine bicarbonate.

6. Process in accordance with claim 4, in which said solvent is toluene.

7. A process for the production of a member selected from the group consisting of 3-(and 5)-amino-1,2,4-triazole, which comprises heating a member selected from the group consisting of a formylaminoguanidine salt at temperatures between about 100 and 120° C. in an inert diluent and recovering said group member formed.

8. A process for the production of a member selected from the group consisting of 3-(and 5)-amino-1,2,4-triazole, which comprises heating a member selected from the group consisting of a formylaminoguanidine salt at temperatures below 120° C. in an inert organic solvent capable of serving as an entrainer while continuously distilling off part of the latter along with water to thereby remove the water formed during the reaction.

References Cited in the file of this patent

UNITED STATES PATENTS

| | | |
|---|---|---|
| 2,233,805 | Broderson et al. | Mar. 4, 1941 |
| 2,534,914 | Kendall et al. | Dec. 19, 1950 |
| 2,744,116 | Shreve et al. | May 1, 1956 |
| 2,763,661 | Grundmann et al. | Sept. 18, 1956 |
| 2,764,594 | Thompson et al. | Sept. 25, 1956 |